(12) United States Patent
Ernst

(10) Patent No.: US 12,085,000 B2
(45) Date of Patent: Sep. 10, 2024

(54) HOUSING FOR A SELECTIVE CATALYST REACTOR, A KIT OF PARTS AND A METHOD

(71) Applicant: Array Industries B.V., Nieuwerkerk aan den IJssel (NL)

(72) Inventor: Robert Johannes Ernst, Nieuwerkerk aan den IJssel (NL)

(73) Assignee: ARRAY INDUSTRIES B.V., Nieuwerkerk aan den IJssel (NL)

( * ) Notice: Subject to any disclaimer, the term of this patent is extended or adjusted under 35 U.S.C. 154(b) by 0 days.

(21) Appl. No.: 17/582,952

(22) Filed: Jan. 24, 2022

(65) Prior Publication Data

US 2022/0235686 A1     Jul. 28, 2022

(30) Foreign Application Priority Data

Jan. 25, 2021   (NL) .................................... 2027379

(51) Int. Cl.
  *B01D 53/94*     (2006.01)
  *F01N 3/20*      (2006.01)
(52) U.S. Cl.
  CPC ....... *F01N 3/2066* (2013.01); *B01D 53/9431* (2013.01)
(58) Field of Classification Search
  CPC .. F01N 3/2066; F01N 13/017; F01N 13/1872; F01N 2450/22; F01N 2470/06; F01N 2590/10; F01N 13/1888; B01D 53/9431; Y02E 20/14; Y02T 10/12
  USPC .......................................................... 422/168
  See application file for complete search history.

(56) References Cited

FOREIGN PATENT DOCUMENTS

| CN | 102989520 A | 3/2013 |
|---|---|---|
| CN | 104018923 B | 6/2016 |
| EP | 3434354 A1 | 1/2019 |

OTHER PUBLICATIONS

Search Report & Written Opinion of Dutch Application No. 2027379 dated Nov. 4, 2021 (11 pages).

*Primary Examiner* — Huy Tram Nguyen
(74) *Attorney, Agent, or Firm* — Pillsbury Winthrop Shaw Pittman, LLP

(57) ABSTRACT

The invention relates to a housing for a selective catalyst reactor for processing exhaust gas from a combustion engine of a combined heat and power system. The housing comprises an annular shaped plate structure forming an elongate accommodation wall defining an inner accommodation volume for containing a catalyst to be flown through by the exhaust gas. The annular shaped plate structure includes a set of plate elements having the same or similar geometry and dimensions.

20 Claims, 7 Drawing Sheets

HOUSING FOR A SELECTIVE CATALYST REACTOR, A KIT OF PARTS AND A METHOD

CROSS-REFERENCE TO RELATED APPLICATIONS

This application claims priority to NL 2027379, filed Jan. 25, 2021, the content of which is hereby incorporated by reference in its entirety.

The invention relates to a housing for a selective catalyst reactor.

Combined heat and power systems, also known as CHP systems or cogeneration systems generate heat and power from the same energy source. Typically, a combustion engine running on gas or another fossil type fuel generates both heat and power for powering and heating large structures such as greenhouses, hospitals or universities.

Selective catalyst reactors are known for cleaning exhaust gases from a combustion engine of such a CHP system. In use, a selective catalyst reactor cleans exhaust gases by removing nitrogen oxides and related pollution gases. In this process, the exhaust gas is forced to flow along and through a catalyst such as palladium for generating a desired chemical reaction.

It appears, in practice, that selective catalyst reactor housings are relatively complex and expensive in construction due to specific requirements to dimensions, e.g. depending to the power of the combustion engine. Typically, a selective catalyst reactor housing is custom sized according to engine output parameters.

It is an object of the present invention to provide a housing for a selective catalyst reactor for processing exhaust gas from a combustion engine of a combined heat and power system that is easy to construct and/or less expensive. Thereto, according to the invention, a housing for a selective catalyst reactor for processing an exhaust gas from a combustion engine of a combined heat and power system is provided, the housing comprising an annular shaped plate structure forming an elongate accommodation wall defining an inner accommodation volume for containing a catalyst to be flown through by the exhaust gas, wherein the annular shaped plate structure includes a set of plate elements having the same, mainly the same or similar geometry and dimensions.

By applying plate elements have a standardized geometry and dimensions, a single type of plate element can be used for constructing a selective catalyst reactor housing. Then, the base element can be manufactured relatively easily in relatively large amounts, leading to lower cost price, while maintaining the flexibility of constructing selective catalyst reactors in a wide variety of sizes and geometries.

The set of plate elements may form corner elements of the annular shaped plate structure. Then, the annular shaped plate structure may be formed by four corner elements mounted together. As an example, the corner elements may have a folded profile formed from a flat plate element.

Advantageously, the annular shaped plate structure may include an additional set of plate elements having the same, mainly the same or similar geometry, as a second set of plate elements having the same, mainly the same or similar geometry and dimensions. The plate elements of the second set may form intermediate plate elements located between adjacent corner elements. As an example, the intermediate elements may be generally rectangular shaped and mainly flat. By applying the intermediate plate elements, larger annular shaped plate structure can be formed.

Further, the annular shaped plate structure may include at least one window module provided with a movable window element, forming a third set or type of plate elements for forming the annular shaped plate structure.

Preferably, the corner elements and optionally the intermediate elements and/or the at least one window module are provided, along their circumferential contour, with an upstanding flange contacting a corresponding flange of an adjacent corner element, intermediate plate element or window module, thereby simplifying a method of constructing the annular shaped plate structure.

Advantageously, the corner elements, optionally with the intermediate elements and/or the at least one window module are arranged and mounted next to each other in a circumferential direction for forming the annular shaped plate structure, thus providing a simple and reliable construction technique.

Optionally, the housing for a selective catalyst reactor includes a single or a multiple number of annular shaped plate structures, preferably constructed using the standardized plate elements.

Further, the housing for a selective catalyst reactor may include a stiffening intermediate plate including a frame having the same, mainly the same or similar dimensions as the at least two annular shaped plate structures, in cross sectional view, the stiffening intermediate plate being provided with stiffening elements forming flow openings for accommodating the catalyst. The grating intermediate plate may be arranged between two adjacent annular shaped plate structures, aligned along a common longitudinal axis.

In addition, the housing for a selective catalyst reactor may include a gas inlet section formed as truncated cone having a proximal end with a relatively small entry opening for connection with an exhaust tube of the combustion engine, and a distal end with a relatively large exit opening for connection with an annular shaped plate structure or stiffening intermediate plate. Preferably, the entry opening of the truncated cone is eccentric relative to the exit opening of the truncated cone so as to provide an optimal flow characteristic of the exhaust gas.

It is noted that in this context the expression same, mainly the same or similar is to be understood as indicating that deviations are relatively small, e.g. smaller than circa 10%, smaller than circa 5% or even smaller, e.g. smaller than circa 2% or smaller than 1%.

Also, the invention relates to a kit of parts.

Further, the invention relates to a method for constructing a housing for a selective catalyst reactor.

Further advantageous embodiments according to the invention are described in the following claims.

It should be noted that the technical features described above or below may each on its own be embodied in a system and/or in a method, i.e. isolated from the context in which it is described, separate from other features, or in combination with only a number of the other features described in the context in which it is disclosed. Each of these features may further be combined with any other feature disclosed, in any combination.

The invention will now be further elucidated on the basis of a number of exemplary embodiments and an accompanying drawing. In the drawing.

It is noted that the figures show merely preferred embodiments according to the invention. In the figures, the same reference numbers refer to equal or corresponding parts.

Figure 1:
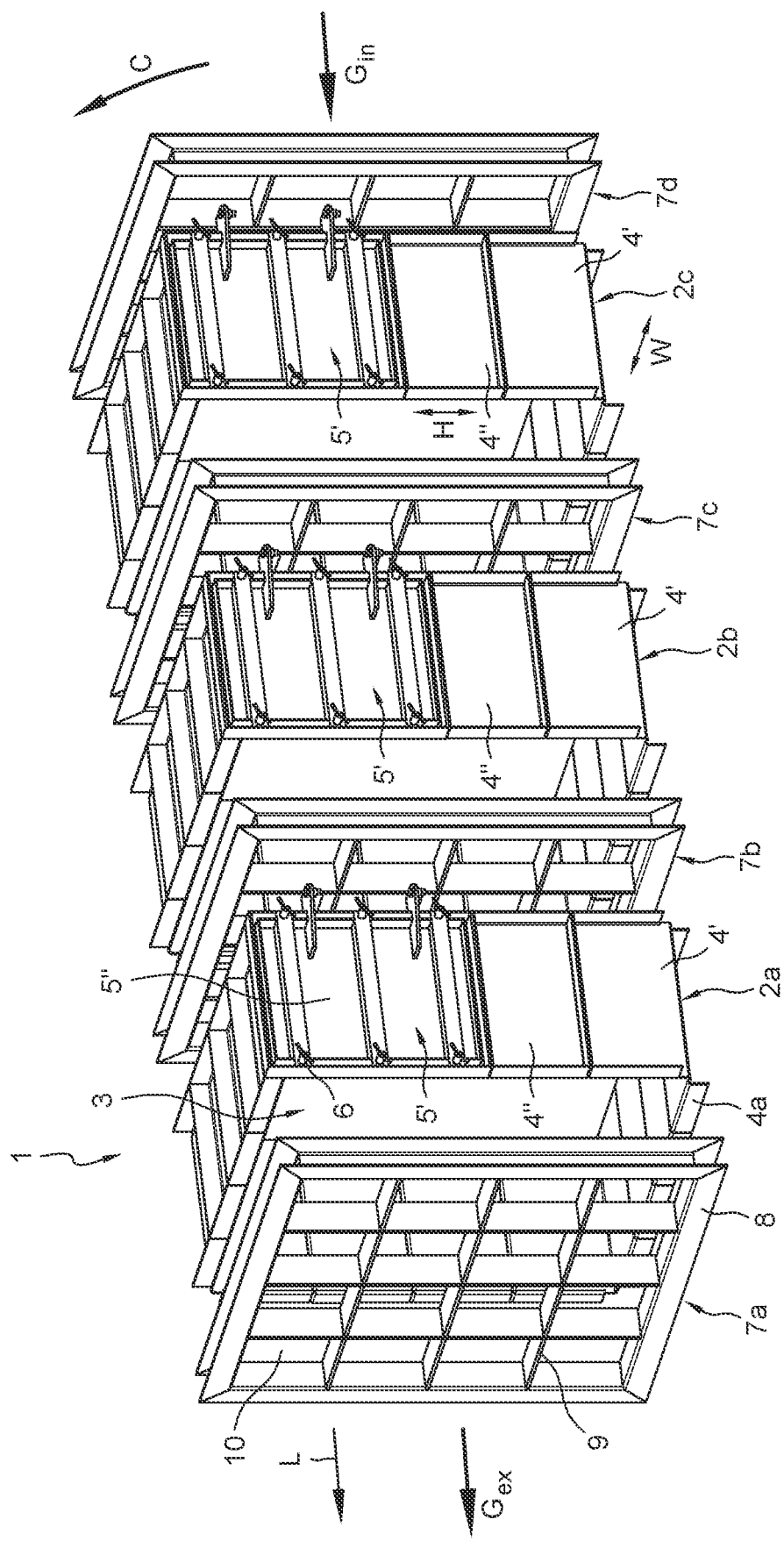
FIG. 1 shows a schematic exploded perspective view of a housing for a selective catalyst reactor according to the invention.

FIG. 1 shows a schematic exploded perspective view of a housing for a selective catalyst reactor 1, also referred to as SCR device, according to the invention. The reactor 1 is arranged for processing an exhaust gas from a combustion engine of a combined heat and power system, also referred to as CHP system or cogeneration system generating heat and power from the same energy source such as a combustion engine running on gas or another fossil type fuel serving as a greenhouse gasses GHG mitigation option.

Typically, a selective catalyst reactor 1 is provided with a catalyst such as palladium that is exposed to the exhaust gas of the combustion engine for removing nitrogen oxides and related pollution gases thus cleaning the exhaust gas.

The housing of the SCR 1 shown in FIG. 1 comprises a multiple number of annular shaped plate structures 2a,b,c arranged in series aligned along a common longitudinal axis L for forming an elongate accommodation wall defining an inner accommodation volume 3 for containing a catalyst to be flown through by the exhaust gas $G_{in}$ entering the accommodation volume 3 from the right and leaving $G_{ex}$ the accommodation volume 3 from the left.

According to an aspect of the invention, the annular shaped plates 2a-c structures each include a set of plate elements 4" having the same, mainly the same or similar geometry and dimensions, and an additional set of plate elements 4" having the same, mainly the same or similar geometry and dimensions. By using plate elements 4'. 4" that have been standardized in geometry and dimensions or sizes, a large variety of SCRs can be constructed from the same standardized base units, the plate elements 4', 4".

Further, the annular shaped plate structures 2a-c in FIG. 1 each includes a window module 5' having a movable window element 5", e.g. for loading and/or unloading catalyst blocks in the accommodation volume 3, and/or for inspection purposes. The movable window element 5" can be selectively removed or opened by loosing butterfly nuts 6. In other implementations, another fixation technique can be applied for providing a movable window element 5" with a structure allowing for pivotal and/or slidable movement.

The plate elements 4' of the first set form corner elements of the annular shaped plate structures 2a-c. Typically, the corner elements 4' are located at corners of the annular shaped plate structures 2a-c.

The plate elements 4" of the second or additional set form intermediate elements located between adjacent corner elements 4' of the annular shaped plate structures allowing housing designs having relatively large dimensions.

The window module 5' forms an optional third type of element that is used for constructing the housing for the annular shaped plate structures 2a-c.

As shown in FIG. 1, the corner elements 4', intermediate elements 4" and the window module 5' are arranged and mounted next to each other in a circumferential direction C for forming the respective annular shaped plate structures 2a-c. The intermediate elements 4" are generally rectangular so as to facilitate an easy mounting process, e.g. using a welding technique. However, in principle, other geometries are applicable for the plate elements 4, e.g. a triangular shape.

In the shown embodiment, the plate elements 4 are generally flat. In practice, the plate elements 4 may have another shape, e.g. slightly curved. Further, in the shown embodiment, the plate elements 4 have edge portions 4a extending generally transverse to the generally flat plane wherein the plate element 4 generally extends further simplifying a reliable mounting process.

Generally, the annular shaped plate structures 2a-c form closed loops for enclosing the accommodation volume 3 sidewardly.

Figure 2A:
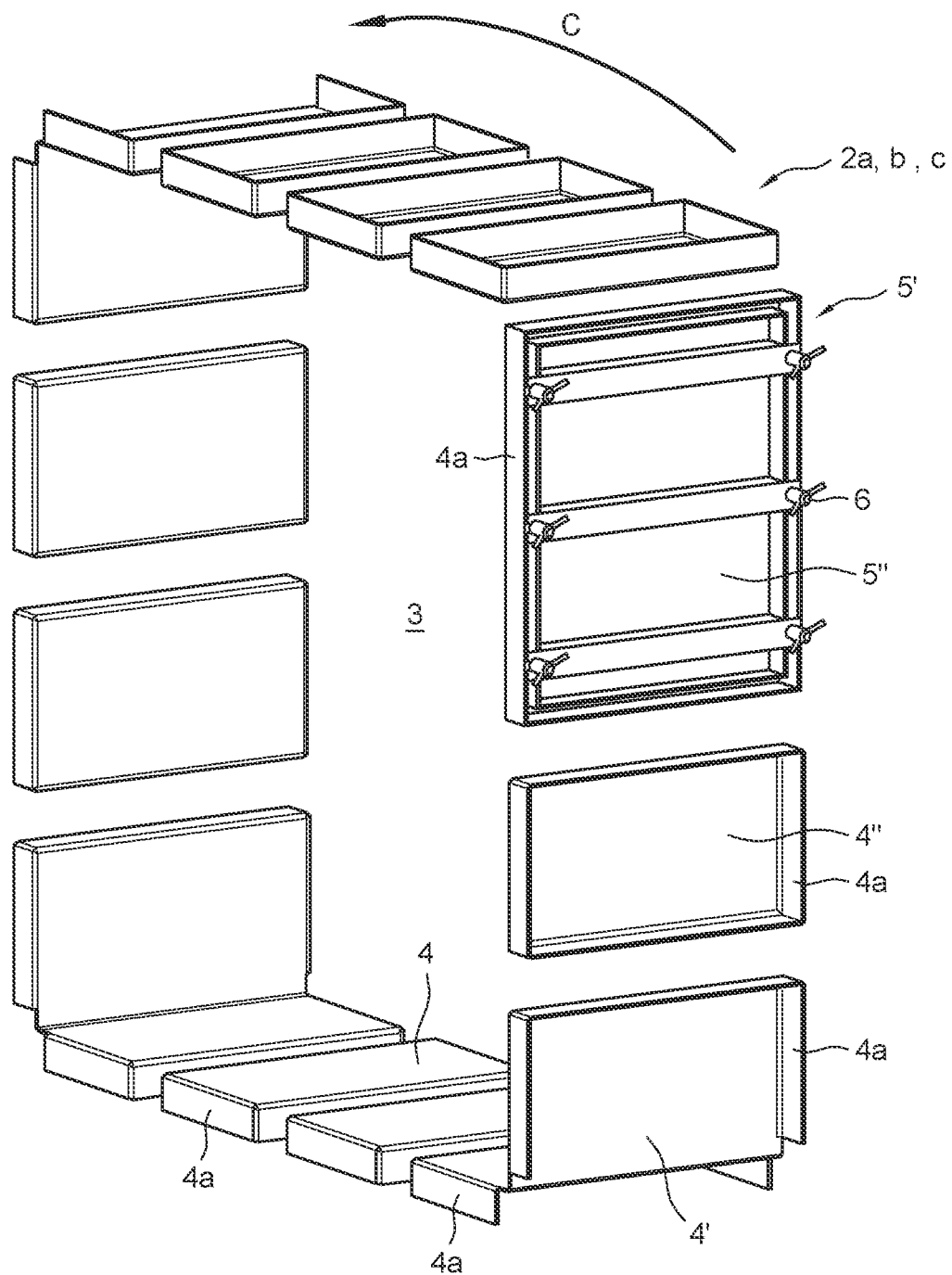
FIG. 2A shows a schematic exploded perspective view of an annular shaped plate structure of the housing for a selective catalyst reactor shown in FIG. 1.

FIG. 2A shows a schematic exploded perspective view of an annular shaped plate structure 2a-c of the housing for a selective catalyst reactor 1 shown in FIG. 1, clearly showing the individual corner elements 4', intermediate elements 4" and the window module 5'.

Due to the use of the standardized plate elements 4', 4" and the window module 5, the annular shaped plate structures 2 have the same, mainly the same or similar dimensions or sizes in the longitudinal direction L. Then, the annular shaped plate structures 2 can be easily arranged in series as a concatenation of structures defining an inner accommodation volume having constant or mainly constant cross sectional dimensions.

Figure 2B:
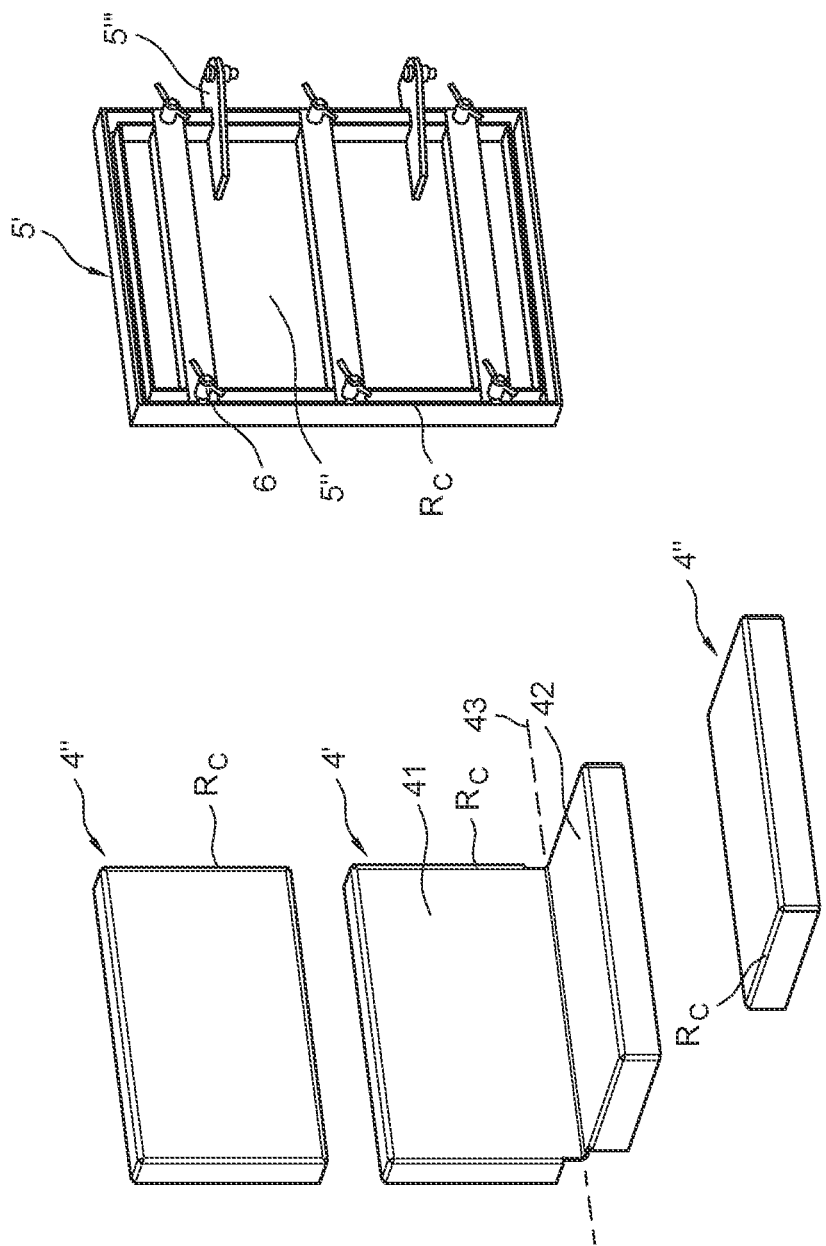
FIG. 2B shows a schematic perspective view of a corner element, two intermediate elements and a window module of the annular shaped plate structure shown in FIG. 2A.

FIG. 2B shows a schematic perspective view of a corner element 4', two intermediate elements 4" and a window module 5' of the annular shaped plate structure shown in FIG. 2A, in a de-assembled state.

The corner element 4' has a folded profile with two plate shaped elements 41, 42 mutually connected via a folding line 43. The two plate shaped elements 41, 42 are mainly transversely oriented with respect to each other. It is noted that the corner element 4' may have another geometry.

The intermediate elements 4" shown in FIG. 2B are generally flat having a rectangular shape.

The window module 5' has a movable window element 5" and hinge elements 5''' allowing the movable window 5" element to swivel.

As shown in FIG. 2B the corner element 4', the intermediate elements 4" and the window module are provided, along their circumferential contour RC, with an upstanding flange 4a contacting, in assembled state, a corresponding flange 4a of an adjacent corner element 4, intermediate element 4" or window module 5'.

Figure 2C:
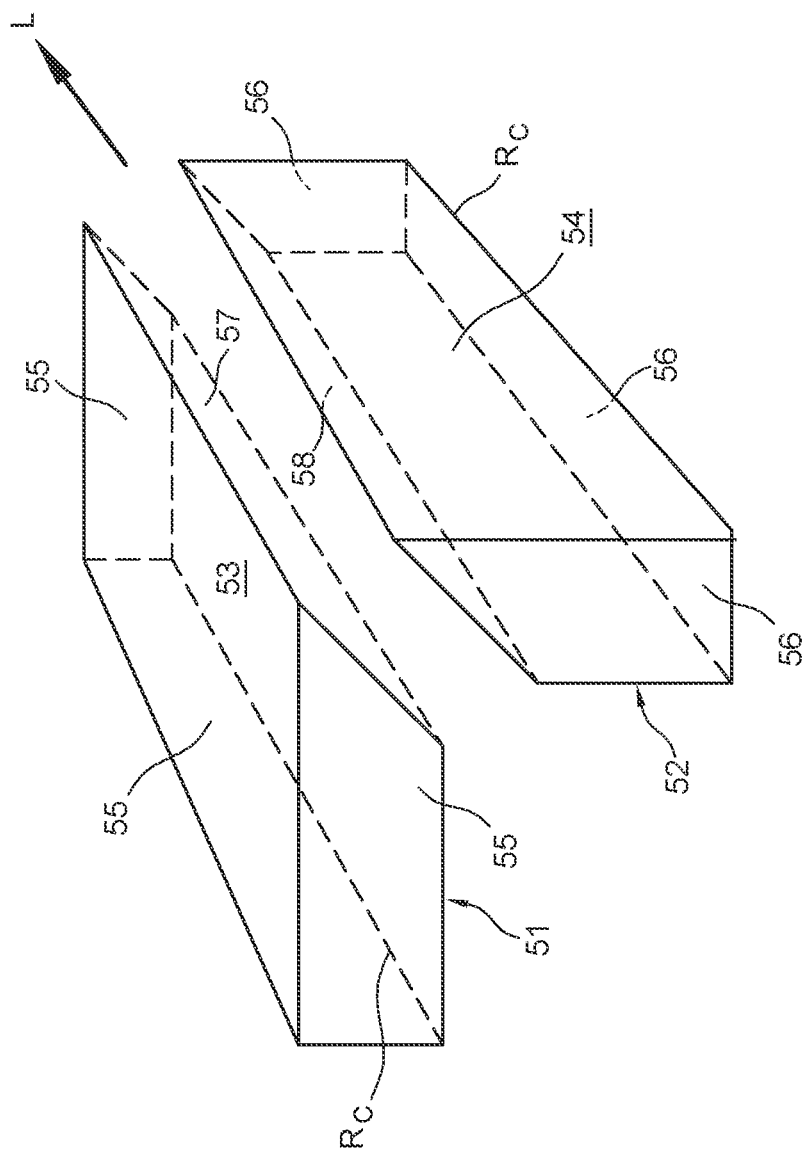
FIG. 2C shows a schematic perspective view of an alternative embodiment of corner elements for implementation in the annular shaped plate structure shown in FIG. 2A.

FIG. 2C shows a schematic perspective view of an alternative embodiment of corner elements 50, 51 for implementation in the annular shaped plate structure shown in FIG. 2A. Each of the corner elements 50, 51 in FIG. 2C has a plate shaped basis 53, 54 provided, along a major part of its rectangular contour RC, with an upstanding flange 55, 56. A remaining part of the rectangular contour RC, a single side of said rectangular contour RC extending in the longitudinal direction L is provided with an inclined flange 57, 58 oriented circa 135 degrees with respect to the plate shaped basis 53, 54 such that the inclined flanges 57, 58 contact each other, in assembled state, forming, together, a mainly orthogonal corner module.

Turning back to FIG. 1, the three annular shaped plate structures 2a-c have the same, mainly the same or similar geometry, i.e. a rectangular geometry such as a square geometry, in cross sectional view, the structures having a width dimension W and a height dimension H. Here, the width dimension W and the height dimension H, respectively, of the three annular shaped plate structures 2 are the same, mainly the same or similar, thereby contributing to a uniform structure of the housing of the SCR 1. In principle, the width dimension W and the height dimension H may differ, e.g. if a locally higher segment of the housing of the SCR is desired. Further, a non-rectangular geometry may be applied, e.g. a triangular geometry. Also, theoretically, a specific annular shaped plate structure may have a deviating geometry such as a pentagon or another polygon.

It is noted that, generally, a cross sectional view is to be understood as a view along the longitudinal axis L, i.e. from a section transverse to said longitudinal axis L.

The shown housing for the SCR 1 further comprises four stiffening intermediate plates 7 including a frame 8 having the same, mainly the same or similar dimensions as annular shaped plate structures 2a-c, in cross sectional view, the stiffening intermediate plate 7 further including stiffening elements 9 forming flow openings 10. The flow openings 10 serve as a flow guiding optimization structure guiding the exhaust gas $G_{in}$ flow through the inner accommodation volume 3 of the housing 1 in an optimized manner.

The stiffening intermediate plates 7 are generally arranged between two neighboring annular shaped plate structures 2, aligned along the common longitudinal axis L. In the shown example, a first grating intermediate plate 7a is located to the left of the first annular shaped plate structure 2a, while a fourth stiffening intermediate plate 7d is located to the right of the third annular shaped plate structure 2c.

It is noted that, in principle, the housing of the SCR 1 can also be provided without stiffening intermediate plates, e.g. if a single annular shaped plate structure 2 is applied.

It is noted that instead of three annular shaped plate structures 2a-c, another number of plate structures can be applied, such as a single annular shaped plate structure or two, four or five annular shaped plate structures. Further, all plate structures can be formed with same, mainly the same or similar dimensions using the standardized plate elements 4', 4". However, a subset of the annular shaped plate structures may be formed in another way, e.g. when a specific geometry or size is desired and/or dedicated material is to be used. In the shown embodiment, a third annular shaped plate structure 2a, at the right hand side in FIG. 1, may be used for performing a first gas cleaning process, while a second annular shaped plate structure 2b, at an intermediate position in FIG. 1, may be used for mixing purposes, and a first annular shaped plate structure 2c, at the left hand side in FIG. 1, may be used for a second gas cleaning process.

The stiffening intermediate plates 7 are generally arranged between two neighboring annular shaped plate structures 2, aligned along the common longitudinal axis L. In the shown example, a first stiffening intermediate plate 7a is located to the left of the first annular shaped plate structure 2a, while a second stiffening intermediate plate 7b is located between the first and the second annular plate shaped plate structure 2a;b, while a third stiffening intermediate plate 7b is located between the second and the third annular plate shaped plate structure 2b;c, and a fourth stiffening intermediate plate 7d is located at the right of the third annular plate shaped plate structure 2c.

Figure 3:
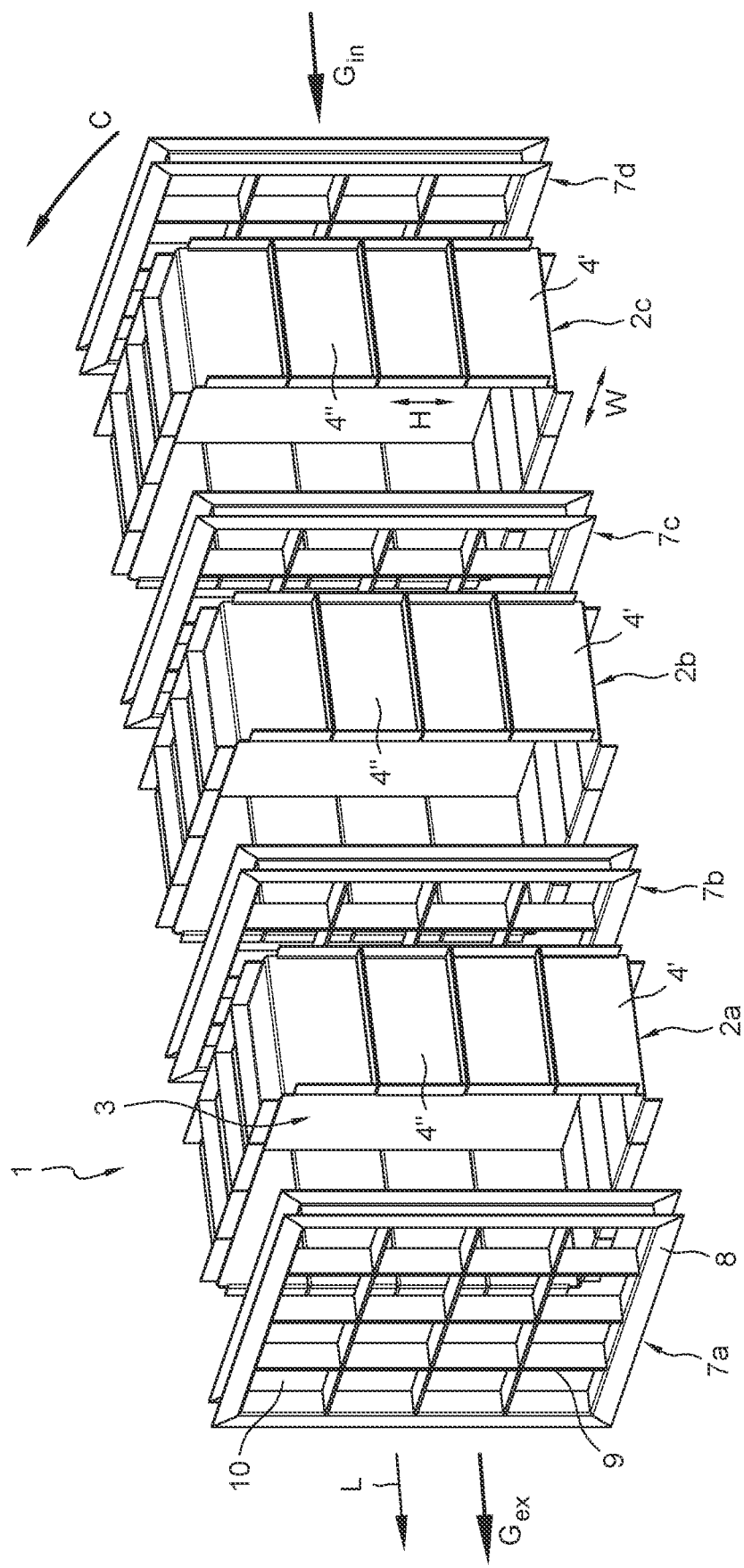
FIG. 3 shows a schematic exploded perspective view of another housing according to the invention.
Figure 4:
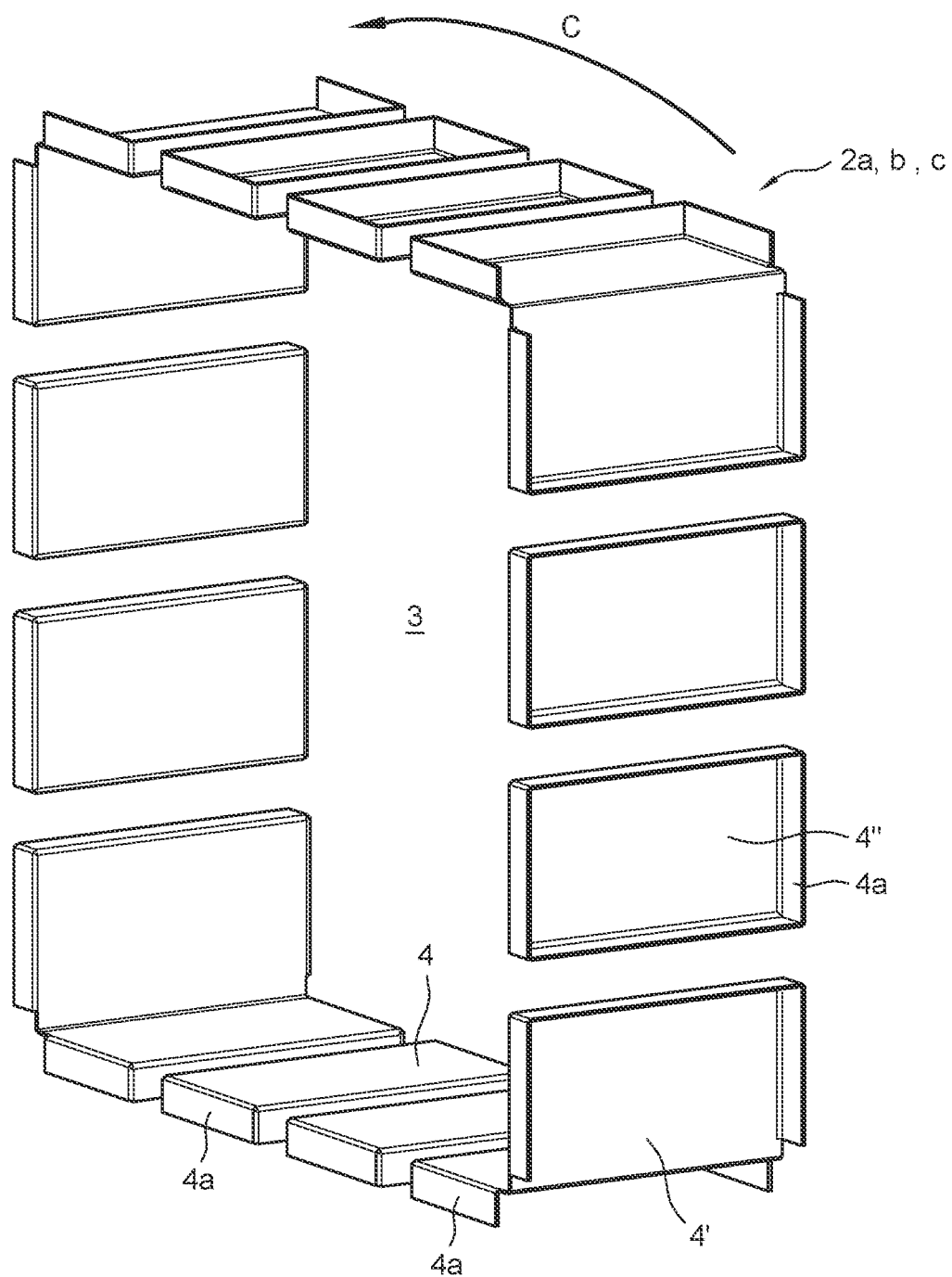
FIG. 4 shows a schematic exploded perspective view of an annular shaped plate structure of the housing shown in FIG. 3.

FIG. 3 shows a schematic exploded perspective view of another housing 1 according to the invention, while FIG. 4 shows a schematic exploded perspective view of an annular shaped plate structure 2a-c of the housing that is shown in FIG. 3. Here, the annular shaped plate structures 2a-c have been formed from corner elements 4' and intermediate elements 4" only, without the window module 5' provided in the annular shaped plate structures of the embodiment shown in FIGS. 1 and 2. The housing 1 shown in FIG. 3 and FIG. 4 can be used for various types of units processing exhaust gas from a combustion engine of a combined heat and power system, including a heat exchange unit or a pre-mixing tube unit.

Figure 5:
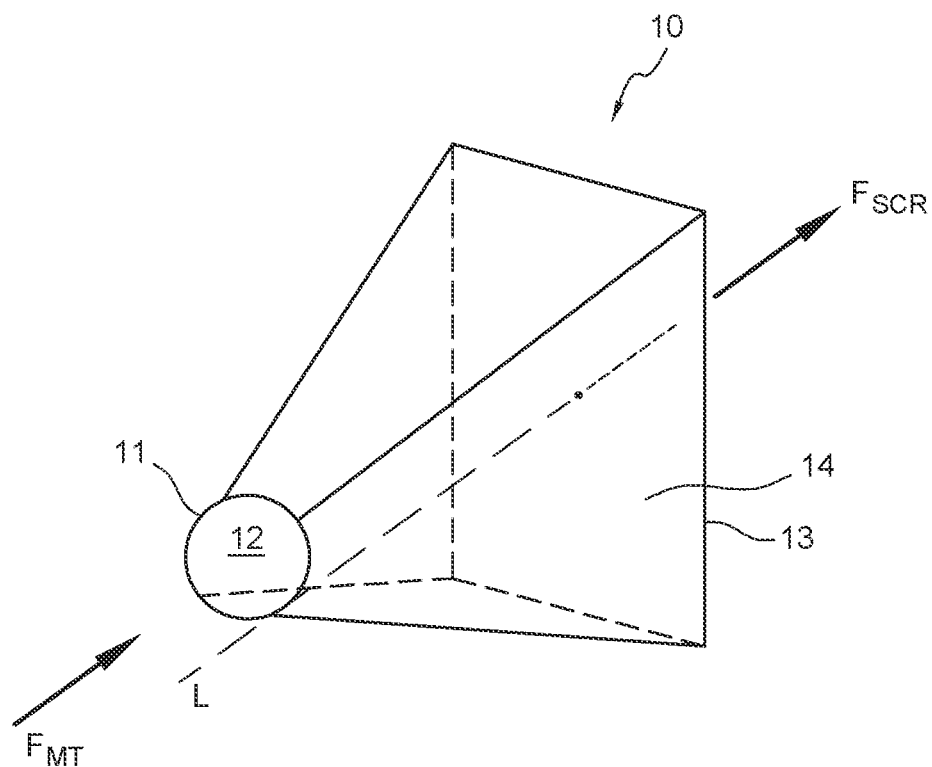
FIG. 5 shows a schematic perspective view of a gas inlet section of a housing as shown in FIG. 1 or 3.

FIG. 5 shows a schematic perspective view of a gas inlet section 10 of a selective catalyst reactor housing 1 as shown in FIG. 1 or 3. The gas inlet section 10 is formed as truncated cone having a proximal end 11 with a relatively small entry opening 12 for connection with an exhaust tube of the combustion engine, for receiving an exhaust gas flow $F_{MT}$ from a mixing tube, and a distal end 13 with a relatively large exit opening 14 for connection with an annular shaped plate structure 2c or a stiffening intermediate plate 7d of the housing 1, for inducing an exhaust gas flow $F_{SCR}$ into the housing 1. In the shown embodiment, the entry opening 12 of the truncated cone 10 is eccentric relative to the exit opening 14 of the truncated cone 10, as entry opening 12 is not aligned with the longitudinal axis L of the housing 1.

It is noted that the shown gas inlet section 10 is optional. In principle, another gas inlet section can be applied to conduct exhaust gas from the combustion engine to the housing 1, e.g. using a gas inlet section having an entry opening 12 that is aligned with the longitudinal axis L of the housing 1, or using a gas inlet section having a staggered profile.

According to an aspect of the invention, a kit of parts can be provided for constructing a housing for a selective catalyst reactor 1, the kit of parts comprising a set of plate elements 4 having the same, mainly the same or similar geometry and dimensions for being arranged and mounted next to each other in a circumferential direction C for forming an annular shaped plate structure 2 of the housing 1.

The set of plate elements in the kit of parts may form corner elements for the annular shaped plate structure, the kit of parts optionally including intermediate plate elements to be located between adjacent corner elements in the annular shaped plate structure, the kit of parts further optionally including at least one window module provided with a movable window element.

Figure 6:
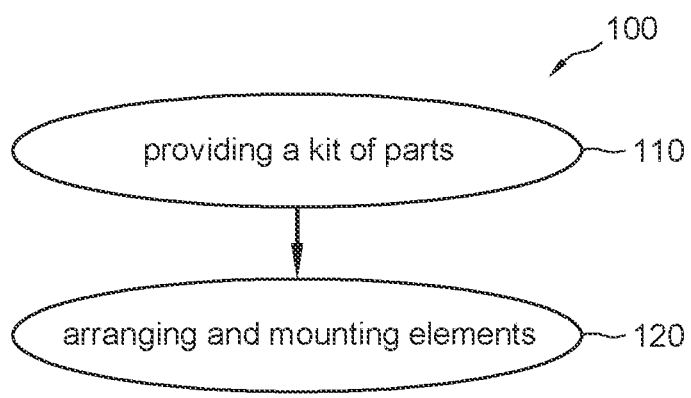
FIG. 6 shows a flow chart for a method according to the invention for constructing a housing for a selective catalyst reactor.

FIG. 6 shows a flow chart for a method according to the invention for constructing a housing for a selective catalyst reactor 1. The method 100 includes a step of providing 110 a kit of parts and a step of arranging and mounting the corner elements and optionally the intermediate elements and/or the at least one window module next to each other in a circumferential direction C for forming an annular shaped plate structure 2 of the housing 1.

The step of arranging and mounting the respective elements may include a sub-step of provisionally fixing the respective elements to each other using provisional fixation elements such as a blind rivet, a sub-step of placing the provisionally fixed annular shaped plate structure in a mould or template, and a sub-step of permanently fixing the respective elements to each other.

It is noted that other sub-steps or techniques may be applicable, replacing at least one of the above described sub-steps or in addition to the above sub-steps.

The invention is not restricted to the embodiments described above. It will be understood that many variants are possible.

These and other embodiments will be apparent for the person skilled in the art and are considered to fall within the scope of the invention as defined in the following claims. For the purpose of clarity and a concise description features are described herein as part of the same or separate embodiments. However, it will be appreciated that the scope of the invention may include embodiments having combinations of all or some of the features described.

The invention claimed is:

1. A housing for a selective catalyst reactor for processing exhaust gas from a combustion engine of a combined heat and power system, the housing comprising an annular shaped plate structure forming an elongate accommodation wall defining an inner accommodation volume for containing a catalyst to be flown through by the exhaust gas, wherein the annular shaped plate structure includes a set of plate elements having the same geometry and dimensions,
    wherein the set of plate elements form corner elements of the annular shaped plate structure,
    wherein the annular shaped plate structure includes an additional set of plate elements having the same geometry and dimensions, and wherein the additional set of plate elements form intermediate plate elements located between adjacent corner elements, and
    wherein the corner elements have a folded profile.

2. The housing for a selective catalyst reactor according to claim 1, wherein the annular shaped plate structure includes at least one window module provided with a movable window element.

3. The housing for a selective catalyst reactor according to claim 1, wherein the corner elements are provided, along their circumferential contour, with an upstanding flange contacting a corresponding flange of an adjacent corner element or part of the annular shaped plate structure.

4. The housing for a selective catalyst reactor according to claim 1, wherein the corner elements are arranged and mounted next to each other in a circumferential direction for forming the annular shaped plate structure.

5. The housing for a selective catalyst reactor according to claim 1, comprising a multiple number of annular shaped plate structures arranged in series aligned along a common longitudinal axis so as to form the elongate accommodation wall, wherein at least two annular shaped plate structures each includes the set of plate elements having the same geometry and dimensions,
    wherein the at least two annular shaped plate structures have the same dimensions in a longitudinal direction.

6. The housing for a selective catalyst reactor according to claim 5, wherein the at least two annular shaped plate structures have a rectangular geometry, in cross sectional view, the structures having a width dimension and a height dimension.

7. The housing for a selective catalyst reactor according to claim 6, wherein the width dimension and the height dimension, respectively, of the at least two annular shaped plate structures are the same.

8. The housing for a selective catalyst reactor according to claim 5, further comprising a stiffening intermediate plate including a frame having the same dimensions as the at least two annular shaped plate structures, in cross sectional view, the stiffening intermediate plate further including stiffening elements forming flow openings.

9. The housing for a selective catalyst reactor according to claim 8, wherein the stiffening intermediate plate is arranged between the two annular shaped plate structures, aligned along the common longitudinal axis.

10. The housing for a selective catalyst reactor according to claim 1, further comprising a gas inlet section formed as truncated cone having a proximal end with a relatively small entry opening for connection with an exhaust tube of the combustion engine, and a distal end with a relatively large exit opening for connection with an annular shaped plate structure or stiffening intermediate plate,
    wherein the relatively small entry opening of the truncated cone is eccentric relative to the relatively large exit opening of the truncated cone.

11. A kit of parts for constructing the housing for a selective catalyst reactor according to claim 1, the kit of parts comprising the set of plate elements having the same geometry and dimensions for being arranged and mounted in a circumferential direction for forming the annular shaped plate structure of the housing.

12. The kit of parts according to claim 11, wherein the set of plate elements form corner elements for the annular shaped plate structure, the kit of parts including intermediate plate elements to be located between adjacent corner elements in the annular shaped plate structure.

13. A method for constructing the housing for a selective catalyst reactor according to claim 1, comprising a step of providing a kit of parts for constructing the housing for a selective catalyst reactor, the kit of parts comprising the set of plate elements having the same geometry and dimensions for being arranged and mounted in a circumferential direction for forming the annular shaped plate structure of the housing, the set of plate elements configured to form corner elements for the annular shaped plate structure, and a step of arranging and mounting the corner elements next to each other in a circumferential direction for forming the annular shaped plate structure of the housing.

14. The housing for a selective catalyst reactor according to claim 1, wherein the intermediate elements are generally rectangular.

15. The kit of parts according to claim 12, further including at least one window module provided with a movable window element.

16. The method according to claim 13, wherein the kit of parts includes intermediate plate elements to be located between adjacent corner elements in the annular shaped plate structure, and wherein the method further comprises a step of arranging and mounting the intermediate elements in the circumferential direction for forming the annular shaped plate structure of the housing.

17. The method according to claim 13, wherein the kit of parts further includes at least one window module provided with a movable window element, and wherein the method further comprises a step of arranging and mounting the at least one window module the circumferential direction for forming the annular shaped plate structure of the housing.

18. A housing for a selective catalyst reactor for processing exhaust gas from a combustion engine of a combined heat and power system, the housing comprising an annular shaped plate structure forming an elongate accommodation wall defining an inner accommodation volume for containing a catalyst to be flown through by the exhaust gas, wherein the annular shaped plate structure includes a set of plate elements having the same geometry and dimensions, wherein the set of plate elements form corner elements of the annular shaped plate structure, wherein the corner elements are provided, along their circumferential contour, with an upstanding flange contacting a corresponding flange of an adjacent corner element or part of the annular shaped plate structure, and wherein the corner elements have a folded profile.

19. The housing for a selective catalyst reactor according to claim 18, wherein the corner elements are arranged and mounted next to each other in a circumferential direction for forming the annular shaped plate structure.

20. A housing for a selective catalyst reactor for processing exhaust gas from a combustion engine of a combined heat and power system, the housing comprising an annular shaped plate structure forming an elongate accommodation wall defining an inner accommodation volume for containing a catalyst to be flown through by the exhaust gas, wherein the annular shaped plate structure includes a set of plate elements having the same geometry and dimensions, wherein the set of plate elements form corner elements of the annular shaped plate structure, and wherein the corner elements have a folded profile.

* * * * *